(12) United States Patent
Kuji et al.

(10) Patent No.: US 6,719,084 B2
(45) Date of Patent: Apr. 13, 2004

(54) EXHAUST SYSTEM FOR VEHICULAR TWO-CYLINDER ENGINE

(75) Inventors: Yasuhiro Kuji, Akashi (JP); Yuichi Kawamoto, Akashi (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/051,107

(22) Filed: Jan. 22, 2002

(65) Prior Publication Data

US 2002/0096385 A1 Jul. 25, 2002

(30) Foreign Application Priority Data

Jan. 23, 2001 (JP) ........................................ 2001-014569

(51) Int. Cl.⁷ .............................................. B60K 13/04
(52) U.S. Cl. ........................ 180/309; 180/296; 180/215
(58) Field of Search .................................. 180/309, 219, 180/225, 89.2, 296, 291; 60/322, 323; 123/572, 573, 574, 41.86

(56) References Cited

U.S. PATENT DOCUMENTS

| | | | | |
|---|---|---|---|---|
| 4,795,420 A | * | 1/1989 | Sakurai et al. ............... | 180/309 |
| 4,809,800 A | * | 3/1989 | Suzuki ........................ | 180/309 |
| 4,903,483 A | * | 2/1990 | Atsuumi et al. ............. | 180/309 |
| 5,271,477 A | * | 12/1993 | Gekka et al. ................ | 180/219 |
| 5,360,081 A | * | 11/1994 | Takegami .................... | 180/309 |
| 5,568,726 A | * | 10/1996 | Yamada et al. .............. | 180/309 |
| 5,966,933 A | * | 10/1999 | Ishihara et al. .............. | 180/309 |
| 6,283,162 B1 | * | 9/2001 | Butler ......................... | 180/309 |

FOREIGN PATENT DOCUMENTS

| JP | A 62-197620 | 9/1987 |
|---|---|---|
| JP | A 1-289792 | 11/1989 |
| JP | U 6-37520 | 5/1994 |

* cited by examiner

*Primary Examiner*—Brian L. Johnson
*Assistant Examiner*—Hau Phan
(74) *Attorney, Agent, or Firm*—Oliff & Berridge, PLC (57) ABSTRACT

An exhaust system for a two-cylinder V-engine, having front and rear cylinders and mounted on a saddle-type all-terrain vehicle, includes a muffler disposed behind the two-cylinder V-engine and provided with two connecting openings, a front-cylinder exhaust pipe having one end connected to the exhaust port of the front cylinder, and a rear-cylinder exhaust pipe having one end connected to the rear cylinder. The front-cylinder exhaust pipe is bent so as to extend rearward along side surfaces of the front and the rear cylinders to the muffler and is detachably connected to the connecting opening. The rear-cylinder exhaust pipe is fitted in the other connecting opening and is welded to the muffler.

4 Claims, 7 Drawing Sheets

EXHAUST SYSTEM FOR VEHICULAR TWO-CYLINDER ENGINE

BACKGROUND OF THE INVENTION

1. Field of the Invention

The present invention relates to an exhaust system for a vehicular two-cylinder engine and, more particularly, to an exhaust system suitable for an automotive two-cylinder v-engine mounted on a straddle-type all-terrain vehicle.

2. Description of the Related Art

Figure 7:
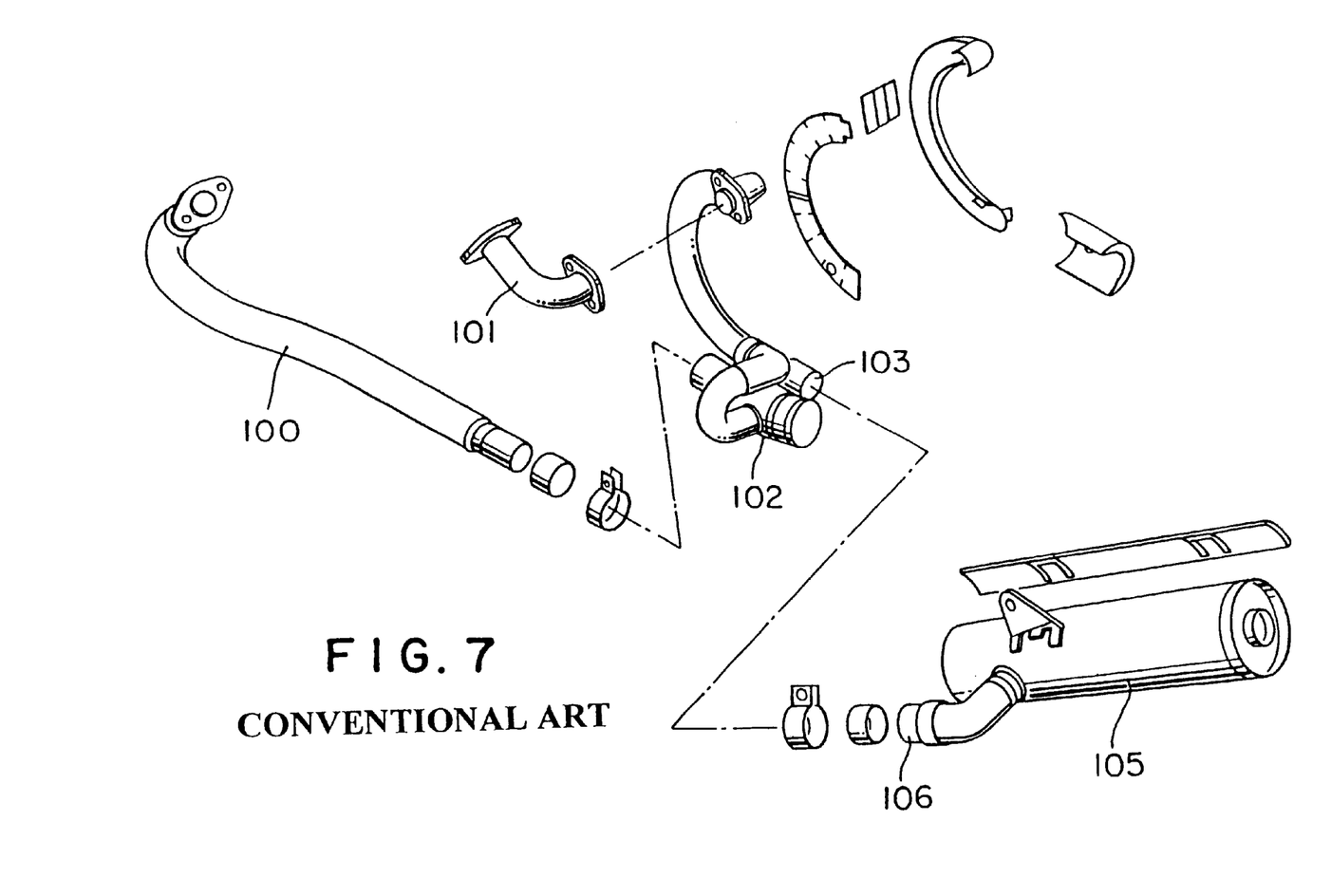
FIG. 7 is an exploded perspective view of a conventional exhaust system.

Conventional exhaust systems for a vehicular two-cylinder engine are classified into those provided with a single muffler for two cylinders and those provided with two mufflers respectively for two cylinders. FIG. 7 is an exploded perspective view of a conventional exhaust system for a two-cylinder V-engine mounted on a motorcycle. This exhaust system is provided with a single muffler 105. The exhaust system includes a front-cylinder exhaust pipe 100, a rear-cylinder exhaust pipe 101, a collecting pipe 102 having an outlet 103, and the muffler 105 provided with a connecting pipe 106. The outlet 103 of the collecting pipe 102 is connected to the connecting pipe 106 of the muffler 105. The front-cylinder exhaust pipe 100 is extended rearward under the crankcase of the two-cylinder engine and is connected to the connecting pipe 106 of the muffler 105 disposed behind the two-cylinder engine via collecting pipe 102.

An exhaust system including two mufflers respectively for the two cylinders of a two-cylinder engine has two exhaust pipes each having one end connected to the cylinder and the other end connected to the muffler.

The exhaust system shown in FIG. 7 needs the collecting pipe 102 of complicated construction, many connecting parts for connecting the exhaust pipes 100 and 101 to the collecting pipe 102, complicated piping and troublesome assembling work.

The exhaust system provided with the two mufflers for two cylinders needs spaces for the two mufflers.

When a two-cylinder V-engine is mounted on a saddle-type all-terrain vehicle, and the front-cylinder exhaust pipe is extended rearward under the crankcase, the exhaust pipe is close to the surface of the ground. Therefore, the exhaust pipe is easily covered and dirtied with mud and sand. The pipes must be arranged in a compact piping securing a sufficient road clearance, i.e., clearance between the front-cylinder exhaust pipe and the surface of the ground, to avoid the front-cylinder exhaust pipe striking against stones and rocks.

SUMMARY OF THE INVENTION

Accordingly, it is an object of the present invention to provide an exhaust system for an automotive two-cylinder engine, consisting of a relatively small number of parts and facilitating work for mounting the exhaust system on a vehicle.

Another object of the present invention to provide an exhaust system for a two-cylinder V-engine mounted on an all-terrain vehicle, including exhaust pipes and a muffler, which the exhaust pipes are extended so that a space around the cylinders of the two-cylinder V-engine may be effectively utilized, the all-terrain vehicle may have a relatively small overall width and the exhaust pipes may not be dirtied with mud and sand and may not strike against stones and rocks.

According to a first aspect of the present invention, an exhaust system for a vehicular two-cylinder engine having a first cylinder and a second cylinder includes a single muffler provided with two connecting openings, a first-cylinder exhaust pipe having one end connected to the first cylinder and the other end connected to one of the connecting openings of the muffler, and a second-cylinder exhaust pipe having one end connected to the second cylinder and the other end connected to the other connecting opening of the muffler, wherein at least either the first-cylinder or the second-cylinder exhaust pipe is connected detachably to the connecting opening of the muffler. Thus the exhaust system does not need the collecting pipe having complicated construction, the exhaust pipes can be extended in a simple arrangement, and the exhaust system facilitates assembling work.

Preferably, in the exhaust system in the first aspect of the present invention, the first muffler is a front cylinder disposed at a front portion with respect to a moving direction of a vehicle, the second muffler is a rear cylinder disposed at a rear portion with respect to the moving direction of the vehicle, the second-cylinder exhaust pipe is connected to the connecting opening and is welded to the muffler, and the first-cylinder exhaust pipe is connected detachably to the connecting opening. Connection of the second-cylinder exhaust pipe connected to the rear cylinder nearer to the muffler by welding further facilitates assembling work.

According to a second aspect of the present invention, an exhaust system for a two-cylinder V-engine having a front cylinder and a rear cylinder and mounted on a saddle-type all-terrain vehicle, said exhaust system includes a muffler disposed behind the two-cylinder V-engine, a front-cylinder exhaust pipe having one end connected to a front cylinder, the front cylinder being disposed at a front portion with respect to a moving direction of a vehicle, and a rear-cylinder exhaust pipe having one end connected to a rear cylinder, the rear cylinder being disposed at a rear portion with respect to the moving direction of the vehicle, wherein the front-cylinder exhaust pipe is bent so as to extend rearward along side surfaces of the front and the rear cylinder to the muffler. Thus the long front-cylinder exhaust pipe of the exhaust system can be extended through a dead space around the side surfaces of the front and the rear cylinders so that the same may not protrude laterally and hence the exhaust system has compact construction.

Preferably, in the exhaust system in the second aspect of the present invention, the muffler is provided with two connecting openings, the rear-cylinder exhaust pipe is connected to one of the connecting opening and is welded to the muffler, and the front-cylinder exhaust pipe is connected detachably to the connecting opening. Connection of the rear-cylinder exhaust pipe connected to the rear cylinder nearer to the muffler by welding further facilitates assembling work.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
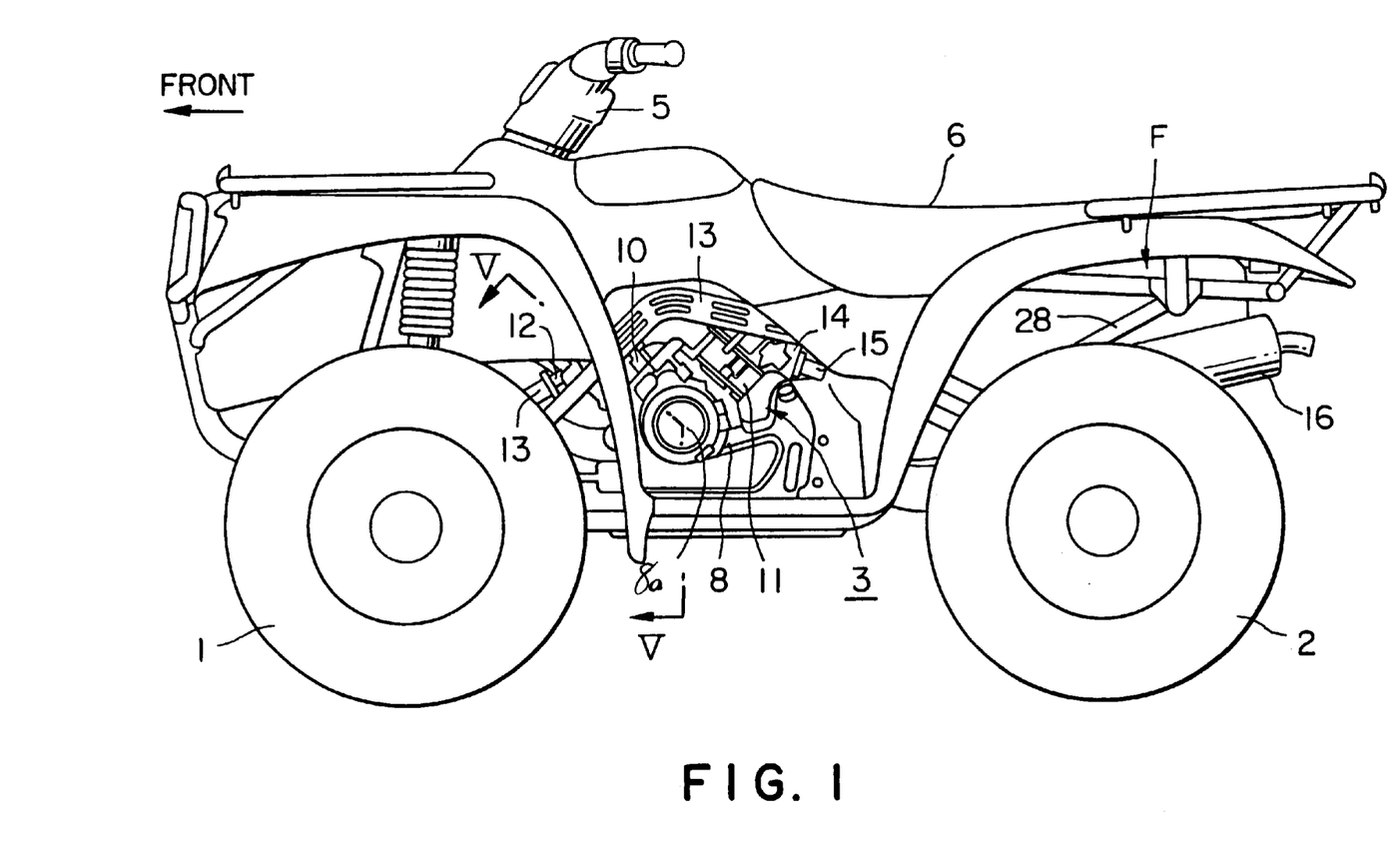
FIG. 1 is side elevation of a straddle-type four-wheeled all-terrain vehicle provided with an exhaust system in a preferred embodiment according to the present invention.

Referring to FIG. 1 showing a straddle-type four-wheeled all-terrain vehicle equipped with an exhaust system in a preferred embodiment according to the present invention, right and left front wheels 1 and right and left rear wheels 2 are suspended from a front part and a rear part, respectively, of a body frame F. A two-cylinder V-engine 3 is mounted on a part of the body frame F between the front wheels 1 and the rear wheels 2. A steering handlebar 5 is disposed in an upper part of the body frame F. A straddle-type seat 6 is disposed behind the steering handlebar 5. The two-cylinder V-engine 3 has a crankcase 8, a front cylinder 10 tilted forward and held on the crankcase 8 and a rear cylinder 11 tilted rearward and held on the crankcase 8. The crankcase 8 has a projection portion 8a. An exhaust port 12 is formed in the front wall of the front cylinder 10 and a front-cylinder exhaust pipe 13 is connected to the exhaust port 12. An exhaust port 13 is formed in the rear wall of the rear cylinder 11 and a rear-cylinder exhaust pipe 15 is connected to the exhaust port 14. A single muffler 16 is supported on a rear part of the body frame F in a space between the body frame F and the left rear wheel 2.

Figure 2:
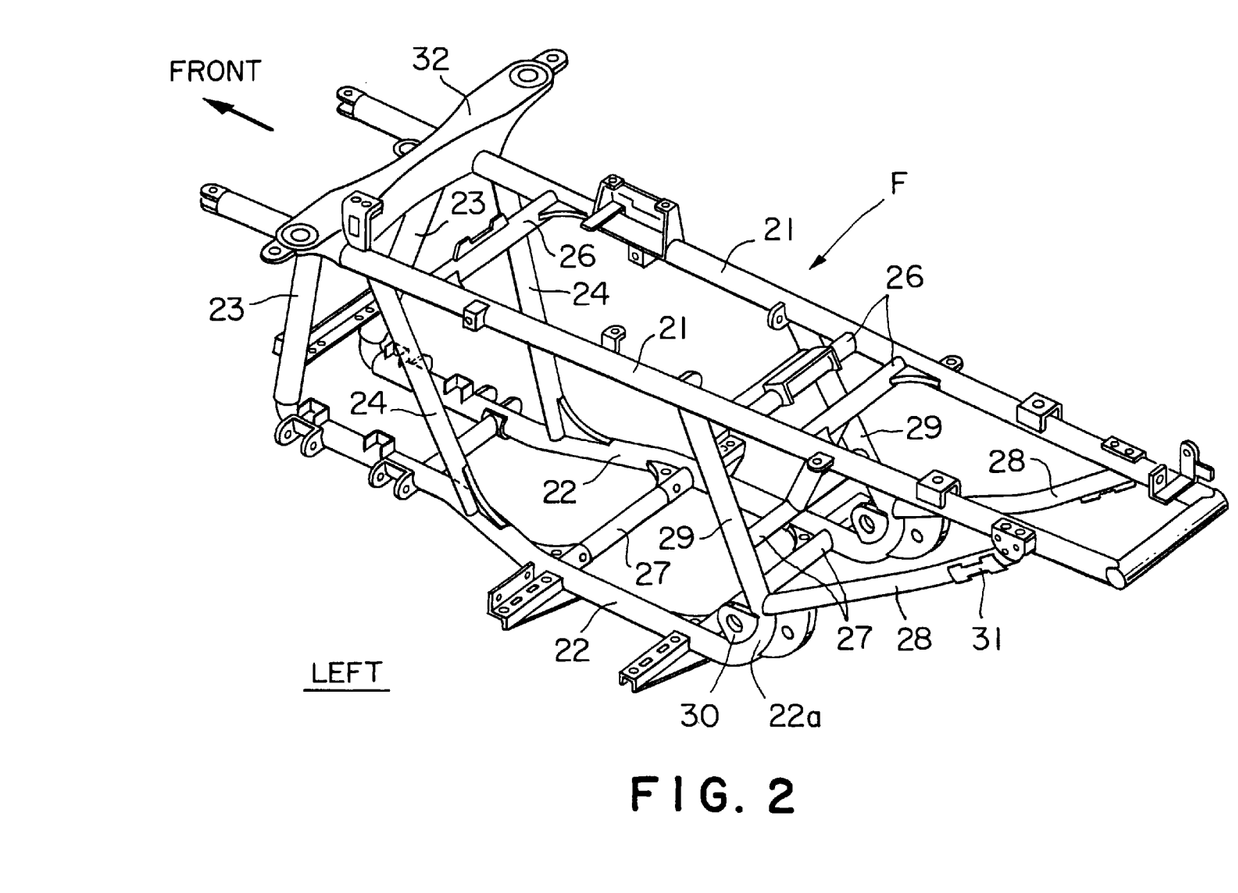
FIG. 2 is a perspective view of a body frame included in the straddle-type four-wheeled all-terrain vehicle shown in FIG. 1.

Referring to FIG. 2 showing the body frame F in a perspective view, the body frame F is built by welding together a pair of upper longitudinal pipes 21, a pair of lower longitudinal pipes 22, first front pipes 23 connecting the respective front ends of the upper pipes 21 and the corresponding lower pipes 22, second front pipes 24 spaced a predetermined distance apart from the first front pipes 23 toward the rear and extended between the upper longitudinal pipes 21 and the lower longitudinal pipes 22, a plurality of upper cross pipes 26 extended between the right and the left upper longitudinal pipes 21, and a plurality of lower cross pipes 27 extended between the right and the left lower longitudinal pipes 22. Rear end parts of the lower longitudinal pipes 22 are bent obliquely upward in curved parts 22a to form rising parts 29 tilted forward. The upper ends of the rising parts 29 are welded to the upper longitudinal pipes 22. Rear support pipes 28 extending obliquely rearward and upward have front ends welded to the curved parts 22a, respectively, and rear ends welded to the rear ends of the upper longitudinal pipes 21, respectively.

Swing arm support members 30 are connected to the curved parts 22a of the lower longitudinal pipes 22. A muffler support bracket 31 is attached to the rear end part of the left rear support pipe 28. A suspension bracket 32 for supporting front suspensions is extended between parts of the upper longitudinal pipes 21.

Figure 4:
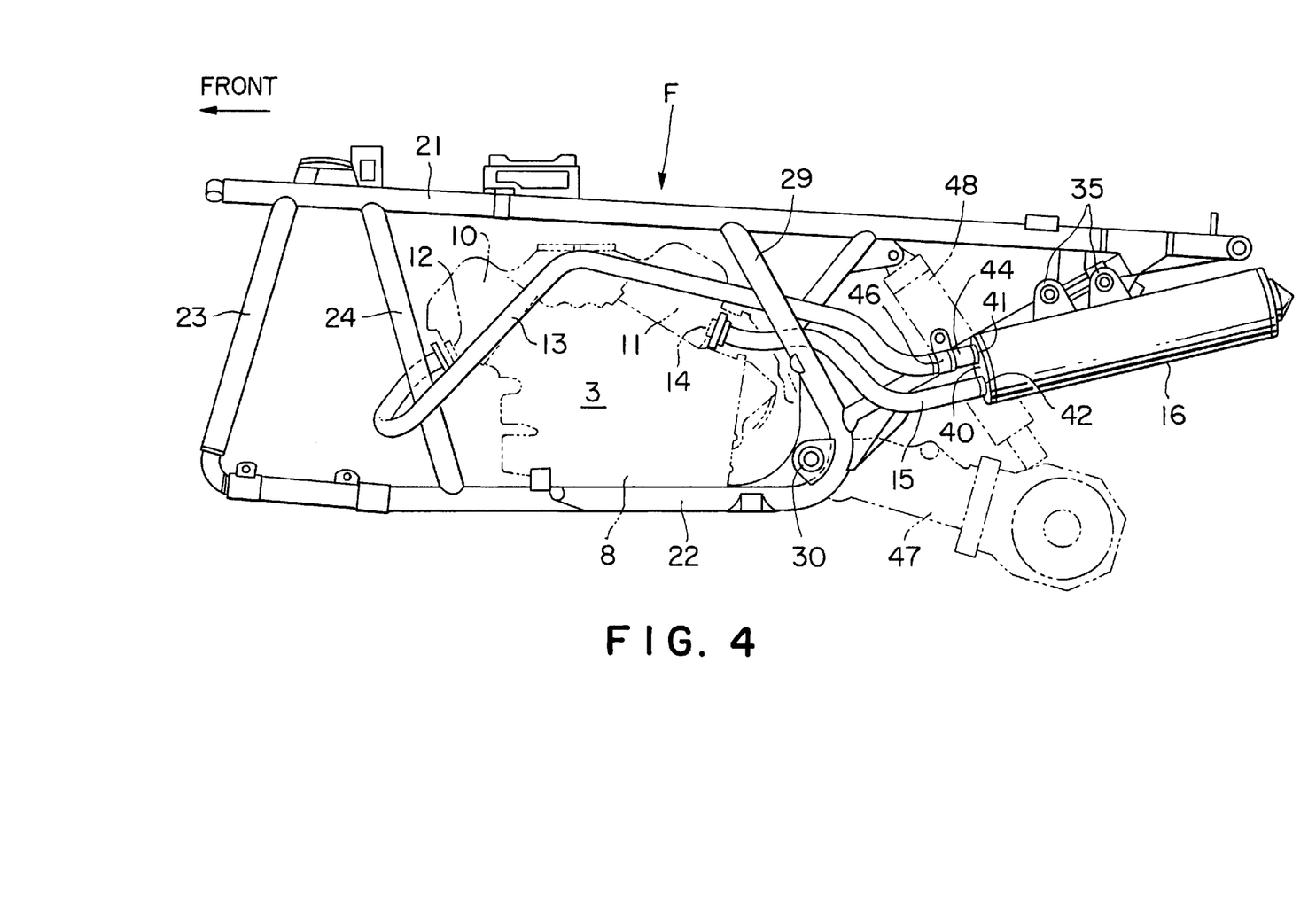
FIG. 4 is a side elevation of the body frame shown in FIG. 2 and the exhaust system of the present invention.

Referring to FIG. 4 showing the exhaust system in connection with the body frame F, the muffler 16 is provided with two mounting lugs 35. The mounting lugs 35 are arranged longitudinally on the upper surface of the muffler 16. The mounting lugs 35 are fastened to the muffler support bracket 31 with bolts. A front-cylinder exhaust pipe connecting opening 41 and a rear-cylinder exhaust pipe connecting opening 42 are formed in the front end wall 40 of the muffler 16. The front-cylinder exhaust pipe connecting opening 41 is above the rear-cylinder exhaust pipe connecting opening 42. A rear end part of the rear-cylinder exhaust pipe 15 is fitted in the rear-cylinder exhaust pipe connecting opening 42 and is welded to the front end wall 40. A connecting pipe 44 is fitted in the front-cylinder exhaust pipe connecting opening 41 and is welded to the front end wall 40 of the muffler 16. A rear end part of the front-cylinder exhaust pipe 13 is detachably fitted in the connecting pipe 44 and is fastened to the connecting pipe 44 with a fastening band 46. Support swing arms 47 for supporting the rear wheels 2 are supported for swing motion by the swing arm support members 30 and are suspended elastically by shock absorbers 48.

Figure 3:
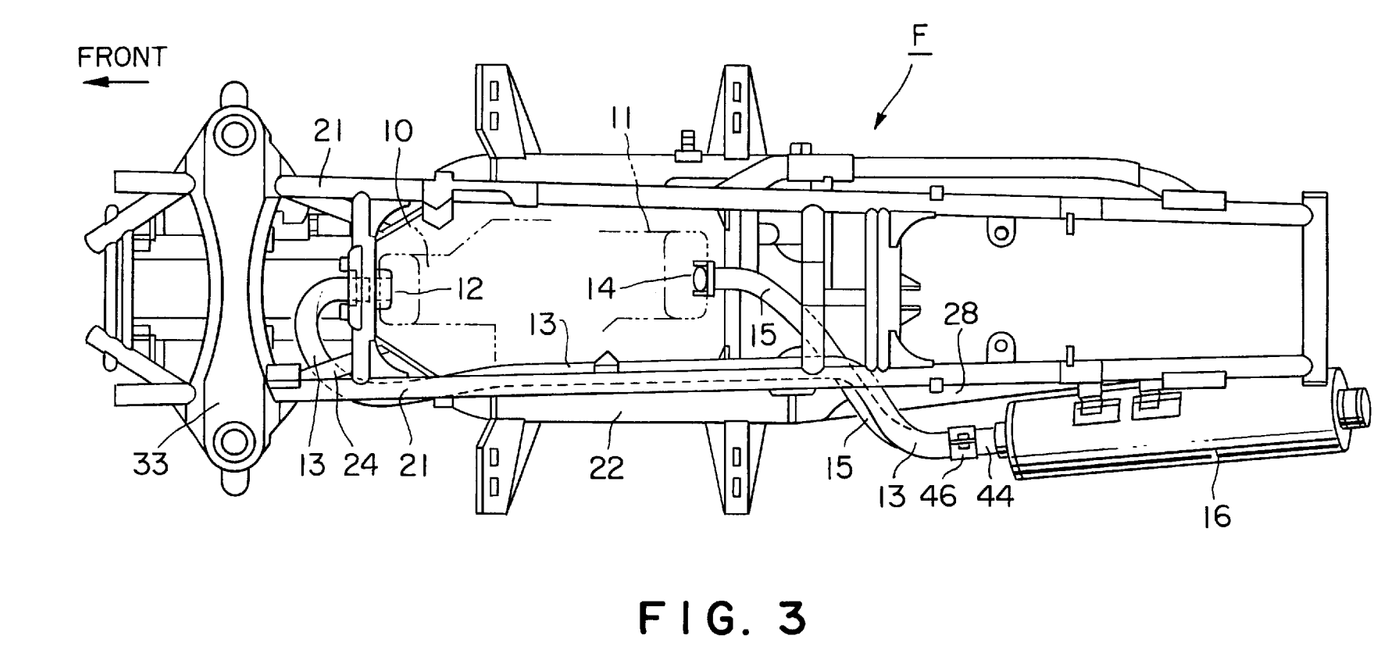
FIG. 3 is a plan view of the body frame shown in FIG. 2 and the exhaust system of the present invention mounted on the body frame.

Referring to FIG. 3 showing the body frame F and the exhaust system in a plan view, the rear-cylinder exhaust pipe 15 extends obliquely to the left from the exhaust port 14 formed in the rear wall of the rear cylinder 11, protrudes to the left from the body frame F at a position in front of the left rear support pipe 28, extends further rearward on the left side of the left rear support pipe 28 to the muffler 16. The front-cylinder exhaust pipe 13 extends to the left in a curve from the exhaust port 12 formed in the front wall of the front cylinder 10, is bent rearward around the left second front pipe 24, extends rearward through a space between the left side of the front cylinder 10 and the rear cylinder 11, and the left side of the body frame F, extends over the rear-cylinder exhaust pipe 15 from a position in front of the left rear support pipe 28, and extends rearward on the left side of the left rear support pipe 28 to the muffler 16.

As shown in FIG. 4, the front-cylinder exhaust pipe 13 extends obliquely upward from a bent part thereof extending around the second front pipe 24 along the left side of the front cylinder 10, extends gradually downward toward the rear on the left side of the rear cylinder 11 from a position corresponding to a V-shaped space between the cylinders 10 and 11.

Figure 5:
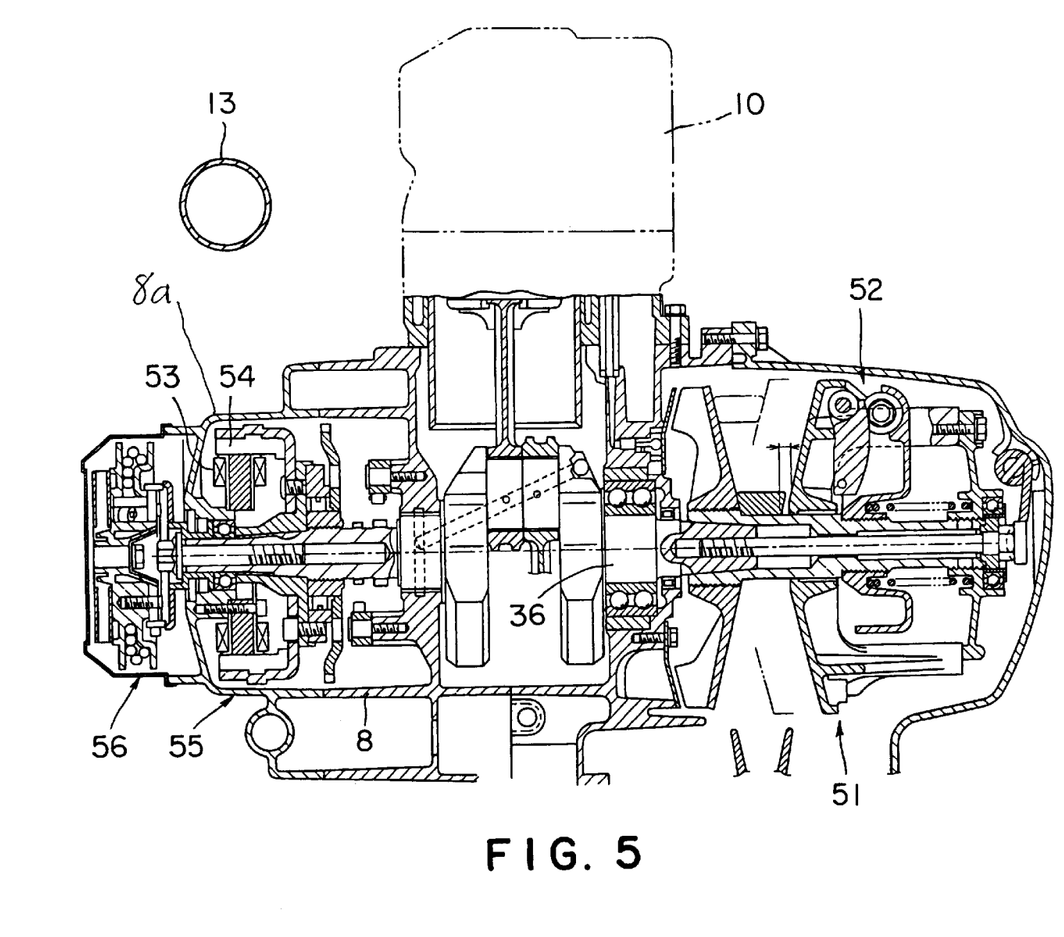
FIG. 5 is a sectional view taken on line V—V in FIG. 1.

Referring to FIG. 5 showing a V-belt type variable-speed transmission in an enlarged sectional view taken on line V—V in FIG. 1, the V-belt type variable-speed transmission has a drive pulley 51 and a thrusting mechanism 52 for adjusting the effective diameter of the drive pulley 51, which are mounted on a right part of a crankshaft 36. A generator 55 including coils 53 and magnets 54, and a recoil starter 56 are mounted on a left part of the crankshaft 36 in an axial arrangement. The crankcase 8 has a relatively big width and projection portion 8a. Therefore, dead spaces limited by substantially L-shaped walls are formed on the right and the left side of the front cylinder 10. The front-cylinder exhaust pipe 13 is extended in one of the dead spaces.

Figure 6:
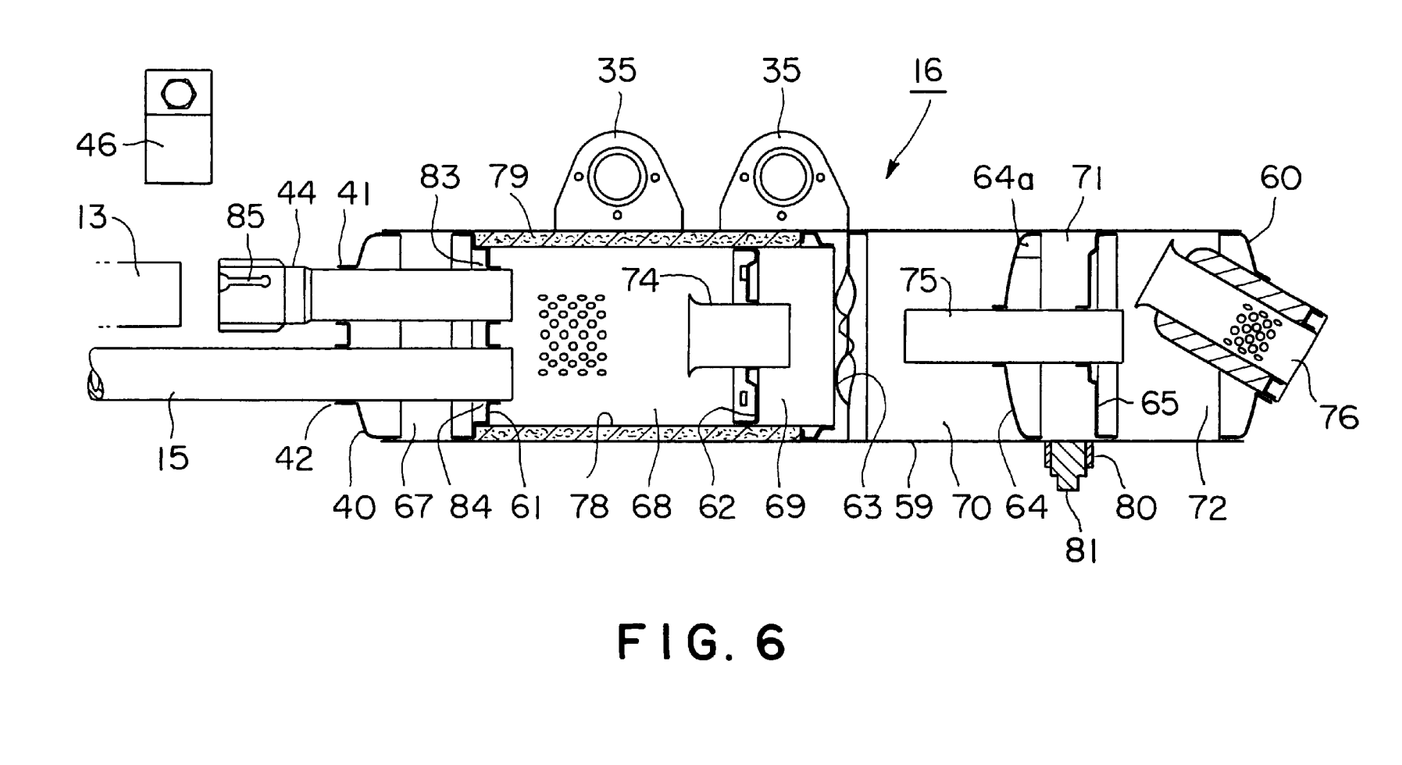
FIG. 6 is an enlarged longitudinal sectional view of a muffler.

Referring to FIG. 6 showing the muffler 16 in an enlarged longitudinal sectional view, the front end wall 40 and a rear end wall 60 are joined to the front and the rear end of an outer pipe 59, respectively, by full-circled welding. Partition plates 61, 62, 64 and 65 and an arrester plate 63 divides the interior of the outer pipe 59 into a resonance chamber 67, a first expansion chamber 68, a second expansion chamber 69, a carbon-separating third expansion chamber 70, a carbon-collecting chamber 71 and a rear expansion chamber 72 arranged in that order from the front toward the rear. A pipe 74 is extended through a central part of the partition plate 62 between the first expansion chamber 68 and the second expansion chamber 69 to make the exhaust gas flow toward a central part of the arrester plate 63. A connecting pipe 75 is extended from the third expansion chamber 70 through the carbon-collecting chamber 71 into the rear expansion chamber 72. A tail pipe 76 is attached to the rear end wall 60. The rear expansion chamber 72 communicates with the outside by means of the tail pipe 76. An inner pipe 78 formed from a perforated plate is inserted in the first expansion chamber 68 and the second expansion chamber 69, and an annular space between the outer pipe 59 and the inner pipe 78 is packed with a shock-absorbing material 79, such as stainless steel wool. The partition plate 64 between the third expansion chamber 70 and the carbon collecting chamber 71 is provided with an opening 64a in its peripheral part. The third expansion chamber 70 and the carbon collecting chamber 71 communicate with each other by means of the opening 64a. The arrester plate 63 has openings provided with twisted guide blades. The exhaust gas passed through the connecting pipe 74 is caused to swirl in the third expansion chamber 70 by the twisted guide blades. Consequently, carbon particles contained in the exhaust gas are caused to flow around the connecting pipe 75 by centrifugal force and to flow through the recess 64a into the carbon collecting chamber 71. A carbon discharge opening 80 is formed in a lower part of a section of the outer pipe 59 corresponding to the carbon collecting chamber 71 and is closed by a detachable plug 81.

The foremost partition plate 61 is used for supporting pipes. The partition plate 61 is provided with pipe holding holes 83 and 84 respectively corresponding to the front-cylinder exhaust pipe connecting opening 41 and the rear-cylinder exhaust pipe connecting opening 42 of the front end wall 40. The connecting pipe 44 extended through the front-cylinder exhaust pipe connecting opening 41 and connected to the front end wall 40 by full-circled welding extends through the upper pipe holding hole 83 and opens into the first expansion chamber 68. The rear-cylinder exhaust pipe 15 extending through the rear-cylinder exhaust pipe connecting opening 42 and connected to the front end wall 40 by full-circled welding extends through the lower pipe holding hole 83 and opens into the first expansion chamber 68. Thus both the front end wall 40 and the partition plate 61 support the connecting pipe 44 and the rear-cylinder exhaust pipe 15. A slit 85 is formed in a front end part of the connecting pipe 44 to facilitate work for inserting the front-cylinder exhaust pipe 13 in the front end part of the connecting pipe 44 and to enable the fastening band 46 to fasten the connecting pipe 44 and the front-cylinder exhaust pipe 13 firmly together.

A method of assembling the exhaust system will be described. Referring to FIG. 4, the rear-cylinder exhaust pipe 15 combined with the muffler 16 by welding is inserted through a space between the left rising part 29 and the left rear support pipe 28 in the body frame F. The muffler 16 is fastened to the muffler support bracket 31 attached to the left rear support pipe 28. The front end of the rear-cylinder exhaust pipe 13 is connected to the exhaust port 14 of the rear cylinder 11. A rear end part of the front-cylinder exhaust pipe 13 is extended on the inner side of the left rising part 29, a front end part of the front-cylinder exhaust pipe 13 is extended through a space in front of the left second front pipe 24 in the body frame F and the front end of the front-cylinder exhaust pipe 13 is connected to the exhaust port 12 of the front cylinder 10. A rear end part of the front-cylinder exhaust pipe 13 is fastened to the connecting pipe 44 by fastening band 46.

As shown in FIG. 4, the long front-cylinder exhaust pipe 13 is extended from the front end of the engine 3 to a rear part of the body frame F via positions above the level of the crankcase 8 on the left side of the cylinders 10 and 11. Thus, the front-cylinder exhaust pipe 13 can be neatly disposed within the width of the body frame F and can be prevented from being splashed with mud and sand and from striking against stones and rocks.

The present invention is applicable to two-cylinder engines other than the two-cylinder V-engine. The present invention is applicable to vehicles other than the saddle-type all-terrain vehicle. The front-cylinder exhaust pipe may be welded to the muffler and the rear-cylinder exhaust pipe may be detachably connected to the muffler.

The present invention has the following effects.

(1) The exhaust system for the vehicular two-cylinder engine having the two cylinders includes the single muffler provided with the two connecting openings, the exhaust pipes connected to the cylinders are connected to the connecting openings of the muffler, respectively, and at least one of the exhaust pipes is connected detachably to the connecting opening of the muffler. Thus the exhaust system needs only one exhaust muffler and needs a reduced number of parts, does not need any collecting pipe having complicated construction, the exhaust pipes can be extended in a simple arrangement, and the exhaust system facilitates assembling work.

(2) The exhaust pipe connected to the rear cylinder disposed at the rear portion with respect to the moving direction of the vehicle is connected to the connecting opening and is welded to the muffler, and the exhaust pipe connected to the front cylinder is connected detachably to the other connecting opening. Connection of the exhaust pipe connected to the cylinder nearer to the exhaust muffler to the muffler by welding further facilitates assembling work.

(3) The exhaust system for the two-cylinder V-engine having the two cylinders and mounted on the saddle-type all-terrain vehicle includes the muffler disposed behind the two-cylinder V-engine, and the front-cylinder exhaust pipe connected to the front cylinder and bent so as to extend rearward along the side surfaces of the two cylinders to the muffler. Thus the long front-cylinder exhaust pipe can be extended through a dead space around the side surfaces of the cylinders so that the same may not protrude laterally and hence the exhaust system has compact construction. Since the exhaust pipes are extended on a level above that of the crankcase, the exhaust pipes will not be dirtied with mud and sand and will not strike against stones and rocks, which is a significant effect because the straddle-type all-terrain vehicle is intended for running on rugged ground, such as the sands and wasteland.

(4) The exhaust system for the vehicular two-cylinder V-engine having the two cylinders includes the single muffler provided with the two connecting openings, the exhaust pipe connected to the rear cylinder is connected to one of the connecting openings and is welded to the muffler, and the exhaust pipe connected to the front cylinder is connected to the other connecting opening and is detachably connected to the muffler. Connection of the exhaust pipe connected to the rear cylinder nearer to the muffler by welding further facilitates assembling work.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An exhaust system for a two-cylinder V-engine having a front cylinder and a rear cylinder and mounted on a saddle-type all-terrain vehicle, said exhaust system comprising:

a muffler disposed behind the two-cylinder V-engine;

a front-cylinder exhaust pipe having one end connected to a front cylinder, the front cylinder being tilted forward with respect to a moving direction of a vehicle;

a rear-cylinder exhaust pipe having one end connected to a rear cylinder, the rear cylinder being tilted rearward with respect to the moving direction of the vehicle; and a crankcase on which the front cylinder and the rear cylinder are being held, the crankcase having a projected portion projected with respect to side surfaces of the front and the rear cylinders, a space being formed by an upper surface of the projected portion and the side surfaces of the front and the rear cylinders, wherein the front-cylinder exhaust pipe is bent upwardly to pass through the space, and passes along the side surfaces of the front and the rear cylinders to the muffler.

2. The exhaust system according to claim 1, wherein the muffler is provided with two connecting openings, the rear-cylinder exhaust pipe is connected to one of the connecting opening and is welded to the muffler, and the front-cylinder exhaust pipe is connected detachably to the other connecting opening.

3. An exhaust system for a two-cylinder V-engine having a front cylinder and a rear cylinder and mounted on a saddle-type all-terrain vehicle, said exhaust system comprising:

a muffler disposed behind the two-cylinder V-engine;

a front-cylinder exhaust pipe having one end connected to a front cylinder, the front cylinder being disposed at a front portion with respect to a moving direction of a vehicle;

a rear-cylinder exhaust pipe having one end connected to a rear cylinder, the rear cylinder being disposed at a rear portion with respect to the moving direction of the vehicle; and a crankcase on which the front cylinder and the rear cylinder are being held, the crankcase having a projected portion, wherein an upper surface of the projected portion and side surfaces of the front and the rear cylinders form a space, wherein the front-cylinder exhaust pipe is bent upwardly to pass through the space, and passes along the side surfaces of the front and the rear cylinders to the muffler.

4. The exhaust system according to claim 3, wherein the muffler is provided with two openings, the rear-cylinder exhaust pipe is connected to one of the openings and is welded to the muffler, and the front-cylinder exhaust pipe is connected detachably to the other opening.

* * * * *